Figure 1:
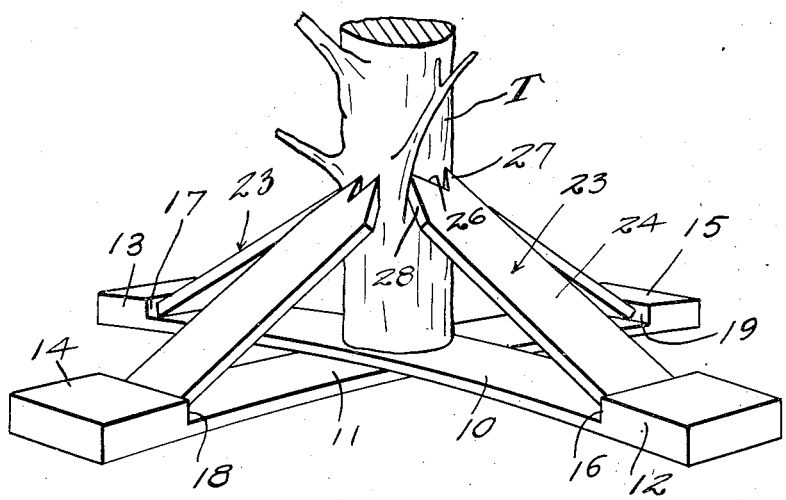

July 12, 1949.  L. G. ROLLER  2,476,223

TREE HOLDER

Filed Sept. 12, 1945

INVENTOR.
L. G. ROLLER
BY
Kimmel & Crowell

Patented July 12, 1949

2,476,223

UNITED STATES PATENT OFFICE 2,476,223

TREE HOLDER

Leslie G. Roller, Des Moines, Iowa

Application September 12, 1945, Serial No. 615,803

1 Claim. (Cl. 248—47)

This invention relates to Christmas tree holders or stands.

An object of this invention is to provide a holder of this kind which may be made out of wood and which can be readily adjusted to properly support the tree in an upright position.

Another object of this invention is to provide a device of this kind which embodies the use of a pair of crossed base forming members and removable bracing members which are adapted to bite into the bark of the tree and support the tree in an upright position.

A further object of this invention is to provide a device of this kind wherein the braces are adapted to bow the base forming members, so that the outer ends of these members will constitute feet for engagement with a floor or plane surface and so that the outer ends of the base forming members may be properly adjusted so that all of these members will contact with the floor and firmly hold the tree in an upright position.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

Figure 2:
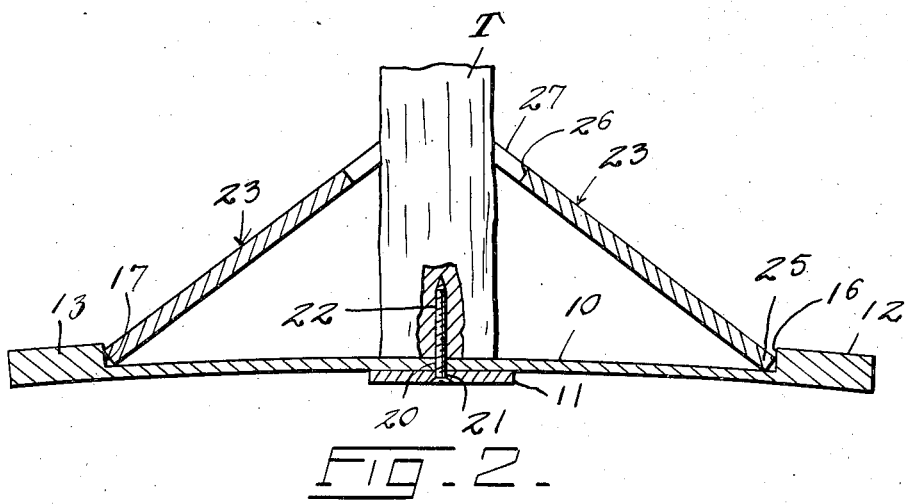

In the drawings:

Figure 1 is a perspective view of a holder constructed according to an embodiment of this invention, and Figure 2 is a transverse sectional view through the device.

Referring to the drawings, the character T designates generally the trunk or lower end of a tree such as a Christmas tree, which it is desired to support in an upright position. A pair of crossed elongated strips 10 and 11 of the same length and relatively wide and thin are disposed below the tree T being formed of wood or the like and capable of being longitudinally bent or bowed, as will be hereinafter described. The strips 10 and 11 each have formed integral with the outer ends thereof upwardly projecting lugs 12, 13, 14 and 15 which form shoulders 16, 17, 18 and 19. The blocks or upwardly projecting members 12 to 15 inclusive are preferably formed integral with the opposite ends of the strips 10 and 11 by thickened flat rectangular or square end portions of the same width as the strips and of a substantial depth or length approximately the same as their width to prevent splitting when formed of wood and these strips are formed in their transverse medians with openings 20 and 21 respectively, which are adapted to register with each other and through which a fastening member 22 in the form of a nail or screw is adapted to be extended and driven or threaded into the lower end of the tree T.

In order to provide a means whereby the base forming strips 10 and 11 may be longitudinally bowed so that only the outer ends thereof will contact with the floor, I have provided a pair of removable bracing members 23 for each strip. The bracing members 23 are of like construction and each includes an elongated strip 24 which is squared off at its lower or outer end 25 whereby the lower or outer end of each bracing member 23 is adapted to engage against a shoulder such as shoulders 16 and 17 of strip 10 and shoulders 18 and 19 of strip 11. Each bracing member 23 at its upper or inner end is formed with a V-shaped notch 26 which forms a pair of V-shaped points 27 which are adapted to pierce the bark of the tree T at a point above the lower end thereof so that the inner end of each bracing member will be firmly secured relative to the tree. Preferably the outer upper portions of each bracing member 23 is also cut away, tapered or mitered, as indicated at 28, so as to form the two points 27 fairly close to each other. The provision of the spaced points 27 provides a means whereby the curved outer surface of the tree will be contacted at two spaced points by each bracing member.

In the use of this tree holder the two base forming members 10 and 11 are adapted to be initially secured by the fastening member 22 to the lower end of the tree T. After the base forming members 10 and 11 are secured to the lower end of the tree, the bracing members 23 are initially engaged at their outer ends against a shoulder at the outer end of a base forming member and the inner or pointed end of each bracing member is then brought downwardly against the side of the tree and forcibly moved downwardly, so that the points 27 will bite into the bark of the tree and the base forming members 10 and 11 will be at least slightly bowed in order that the outer ends of these members will project slightly below the lower surface of the lower base forming member 11. The bracing members are adapted to be adjusted relative to the tree T and each other so that the outer ends of the base forming members will be in firm contact with the floor. The base forming members 10 and 11 are of sufficient length to provide a firm foundation or base for the tree and are adapted to be made out of wood or other similar material which can be bowed or placed under tension through the bracing members.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claim.

What I claim is:

A tree holder comprising a pair of elongated relatively thin resilient crossed strips disposed one over the other, a pair of shallow lugs on the upper side of each strip at the opposite ends thereof and forming shallow inwardly facing shoulders, means to secure said strips at their crossing point to each other and against the lower end of a tree trunk, and a pair of bracing members for each strip, each bracing member abutting at its outer end against the top surface of a crossed strip and a shoulder formed by a lug and the inner end of each bracing member being formed with means for biting into the tree whereby said bracing members will bend the upper crossed strip longitudinally so that the outer ends of said upper strip will be on the same horizontal plane with the lower strip to firmly support the tree.

LESLIE G. ROLLER.

REFERENCES CITED

The following references are of record in the file of this patent:

UNITED STATES PATENTS

| Number | Name | Date |
| --- | --- | --- |
| 926,638 | Barton | June 29, 1909 |
| 1,240,319 | Cronick | Sept. 18, 1917 |
| 1,397,254 | Karschitz | Nov. 15, 1921 |
| 1,457,820 | Cleveland | June 5, 1923 |
| 1,613,930 | Burman | Jan. 11, 1927 |

FOREIGN PATENTS

| Number | Country | Date |
| --- | --- | --- |
| 161,070 | Germany | June 8, 1905 |